United States Patent
Shahbazi et al.

(10) Patent No.: US 12,495,089 B2
(45) Date of Patent: Dec. 9, 2025

(54) EFFICIENT DATACENTER ENERGY MANAGEMENT BASED ON COMPUTE CAPACITY AND FLEET MANAGEMENT

(71) Applicant: Google LLC, Mountain View, CA (US)

(72) Inventors: Mahya Shahbazi, San Jose, CA (US); Binayak Roy, Santa Clara, CA (US); Gregory Imwalle, Sunnyvale, CA (US); Varun Sakalkar, Redwood City, CA (US); Patrick Heisel, Breckenridge, CO (US); Parthasarathy Ranganathan, San Jose, CA (US)

(73) Assignee: Google LLC, Mountain View, CA (US)

( * ) Notice: Subject to any disclaimer, the term of this patent is extended or adjusted under 35 U.S.C. 154(b) by 23 days.

(21) Appl. No.: 18/545,001

(22) Filed: Dec. 19, 2023

(65) Prior Publication Data
US 2025/0202971 A1    Jun. 19, 2025

(51) Int. Cl.
G06F 15/173    (2006.01)
H04L 67/1008    (2022.01)
H04L 67/101    (2022.01)

(52) U.S. Cl.
CPC ........ H04L 67/1008 (2013.01); H04L 67/101 (2013.01)

(58) Field of Classification Search
None
See application file for complete search history.

(56) References Cited

U.S. PATENT DOCUMENTS

| 10,664,324 B2 | 5/2020 | Gross et al. | |
| 2010/0325453 A1* | 12/2010 | Dawson | G06F 9/505 713/320 |
| 2017/0139462 A1* | 5/2017 | Potlapally | G06F 11/3062 |

FOREIGN PATENT DOCUMENTS

EP    2399183 B1    11/2016

OTHER PUBLICATIONS

Tang, D. "Tuning Servers for Energy Savings", [online] Retrieved from the Internet: <URL:https://devblogs.microsoft.com/sustainable-software/tuning-servers-for-energy-savings/#:~:text=In%20the%20second%20case%20the,therefore%20less%20power%20is%20consumed>, Apr. 5, 2021, 7 pages.

Extended European Search Report for European Patent Application No. 24213135.7 dated May 21, 2025. 9 pages.

Desu et al. Latency-Aware Dynamic Server and Cooling Capacity Provisioner for Data Centers. Proceedings of the 3rd Workshop On Cyber-Security Arms Race, ACMPUB27, New York, NY, USA, Nov. 1, 2021 (Nov. 1, 2021), pp. 335-349, DOI: 10.1145/3472883.3487015.

* cited by examiner

*Primary Examiner* — Wing F Chan
*Assistant Examiner* — Andrew Woo
(74) *Attorney, Agent, or Firm* — Lerner David LLP

(57) ABSTRACT

The technology is generally directed to a management framework that uses a predictive feedback control loop to reduce energy consumption of a datacenter. The framework determines how to place a series of jobs or workloads on the available pool of machines in a datacenter. For example, the framework may consider the current workload profile and the workload demand forecast of the datacenter to determine an updated workload profile. The updated workload profile may include a redistribution of the workloads or jobs onto a first subset of the machines such that a second subset of the machines can enter an idle state.

20 Claims, 6 Drawing Sheets

EFFICIENT DATACENTER ENERGY MANAGEMENT BASED ON COMPUTE CAPACITY AND FLEET MANAGEMENT

BACKGROUND

Cloud computing makes use of a network of servers accessible via the Internet, or more generally a wide area network ("WAN"), to manage, store, and process data. The servers forming the network are usually housed in datacenters. These datacenters are deployed at various locations across the globe and form the backbone of our current digital society.

Operation of the servers and other ancillary equipment (e.g., storage, routers, switches, fans, transmitters/receivers, etc.) in a datacenter requires energy supplied through a datacenter power distribution network. The datacenter power distribution network is coupled to public utility sources and, typically, backup generators. As the demand for networked computing services grows, the energy demand associated with datacenters grows by requiring, for example, more datacenters, increased use of existing datacenters (e.g., less down time for the servers), and/or deployment of additional computing resources (e.g., servers, storage, etc.) in existing datacenters. In addition, utilization of server computing resources typically drops during non-peak hours due to reduced workload demand and/or may persist due to overordering of computing resources that are not needed. Reduced server utilization results in degraded efficiency and increased energy cost per unit of server workload. Increases in energy, whether caused by degraded efficiency or increases in energy demand, impact the carbon footprint caused by datacenter operations. Accordingly, improving the energy efficiency of datacenter(s) can reduce their carbon footprint.

BRIEF SUMMARY

The technology is generally directed to a datacenter server or machine management framework that uses a predictive feedback control loop to reduce energy consumption of a datacenter. The framework determines how to place a series of jobs or workloads on the available pool of machines in a datacenter. For example, the framework may consider the current workload profile and the workload demand forecast of the datacenter to determine an updated workload profile. The updated workload profile may include a redistribution of the workloads or jobs onto a first subset of the machines such that a second subset of the machines can enter an idle state.

One aspect of the disclosure is directed to a method for managing energy usage in a datacenter. The method may comprise receiving, at a processing element, a current workload profile and a workload demand forecast, the current workload profile including a power usage profile for a first set of servers from an available pool of servers in the datacenter that are executing one or more current workloads associated with the current workload profile, determining, by the processing element, an updated workload profile for the available pool of servers in the datacenter based on the current workload profile and the workload demand forecast, the updated workload profile including a redistribution of the current workload profile onto a second set of servers of the available pool of servers, and causing one or more servers of the first set of servers to enter an idle state.

The workload demand forecast may include information identifying upcoming workloads or jobs to be processed by the available pool of servers. The workload demand forecast may include at least one of information indicating workload priority, system level objectives ("SLOs"), expected completion time, eviction tolerance, platform preference, hardware preference, resource requirements, or latency tolerance associated with the upcoming workloads or jobs.

The redistribution of the current workload profile onto the second set of servers may comprise allocating an aggregate usage level associated with the first set of servers to the second set of servers.

The method may further comprise adjusting an amount of the first set of servers to enter an idle state based on a change in the workload demand forecast and current workload being served.

The workload demand forecast may include upcoming workloads or jobs of non-uniform sizes. The current workload profile may include current workloads or jobs of non-uniform sizes. When determining the updated workload profile the method may further comprise bin-packing the upcoming workloads of non-uniform sizes and the current workloads of non-uniform sizes onto the second set of servers.

The processing element may comprise a datacenter scheduler. The method may further comprise adjusting an idle state of at least one server of the first set of servers based on a change in workload usage and the workload demand forecast. Adjusting the idle state may comprise adjusting the idle state to a deep idle state or a less deep idle state.

Another aspect of the disclosure is directed to a system comprising one or more processors. The one or more processors may be configured to receive a current workload profile and a workload demand forecast, the current workload profile including a power usage profile for a first set of servers from an available pool of servers in a datacenter that are executing one or more current workloads associated with the current workload profile, determine an updated workload profile for the available pool of servers in the datacenter based on the current workload profile and the workload demand forecast, the updated workload profile including a redistribution of the current workload profile onto a second set of servers of the available pool of servers, and cause one or more servers of the first set of servers to enter an idle state.

Yet another aspect of the disclosure is directed to one or more non-transitory computer-readable medium storing instructions, which when executed by one or more processors, cause the one or more processors to receive a current workload profile and a workload demand forecast, the current workload profile including a power usage profile for a first set of servers from an available pool of servers in a datacenter that are executing one or more current workloads associated with the current workload profile, determine an updated workload profile for the available pool of servers in the datacenter based on the current workload profile and the workload demand forecast, the updated workload profile including a redistribution of the current workload profile onto a second set of servers of the available pool of servers, and cause one or more servers of the first set of servers to enter an idle state.

DETAILED DESCRIPTION

The disclosed technology is a method and system that manages operation of the servers or machines in a datacenter such that the overall power efficiency of the datacenter is improved, and in some instances optimized. In this way, the disclosed technology improves datacenter energy consumption efficiency and can reduce the carbon footprint of datacenters in a cloud computing environment.

More specifically, the disclosed technology comprises a server management framework that uses a predictive feedback control loop to reduce energy consumption of a datacenter. The framework determines how to place a series of jobs or workloads on the available pool of servers in a datacenter. While reference is made to servers and/or machines throughout this disclosure, the technology may be used in other examples and systems that execute and/or server jobs, such as accelerator systems, including TPUs and GPUs. The use of server and/or machine, therefore, are just some examples that can be used in conjunction with the technology disclosure herein and are not intended to be limiting.

The server management framework operates using a compute workload demand forecast to create a dynamically sized pool of servers that are put into idle states during non-peak hours. The compute demand forecast serves as one of two inputs to an energy control algorithm. The other input includes parameters associated with current operation of the datacenter servers including, for example, the compute workload usage and server states. The algorithm uses the workload demand forecast, workload usage and server states to adaptively manage the server pool by shifting the workload among the servers such that the servers in the datacenter are bin-packed to run at a higher utilization rate and idling under-utilized servers to form an idle server pool. The idled servers may be placed into a deep idle state. According to some examples, the algorithm may use the workload demand forecast, workload usage, and server states to adaptively manage the server pool by placing and/or shifting the workload among the servers such that some of the servers in the datacenter are packed tighter at a higher utilization while others run in an idle state, such as a deep idle state.

Figure 1:
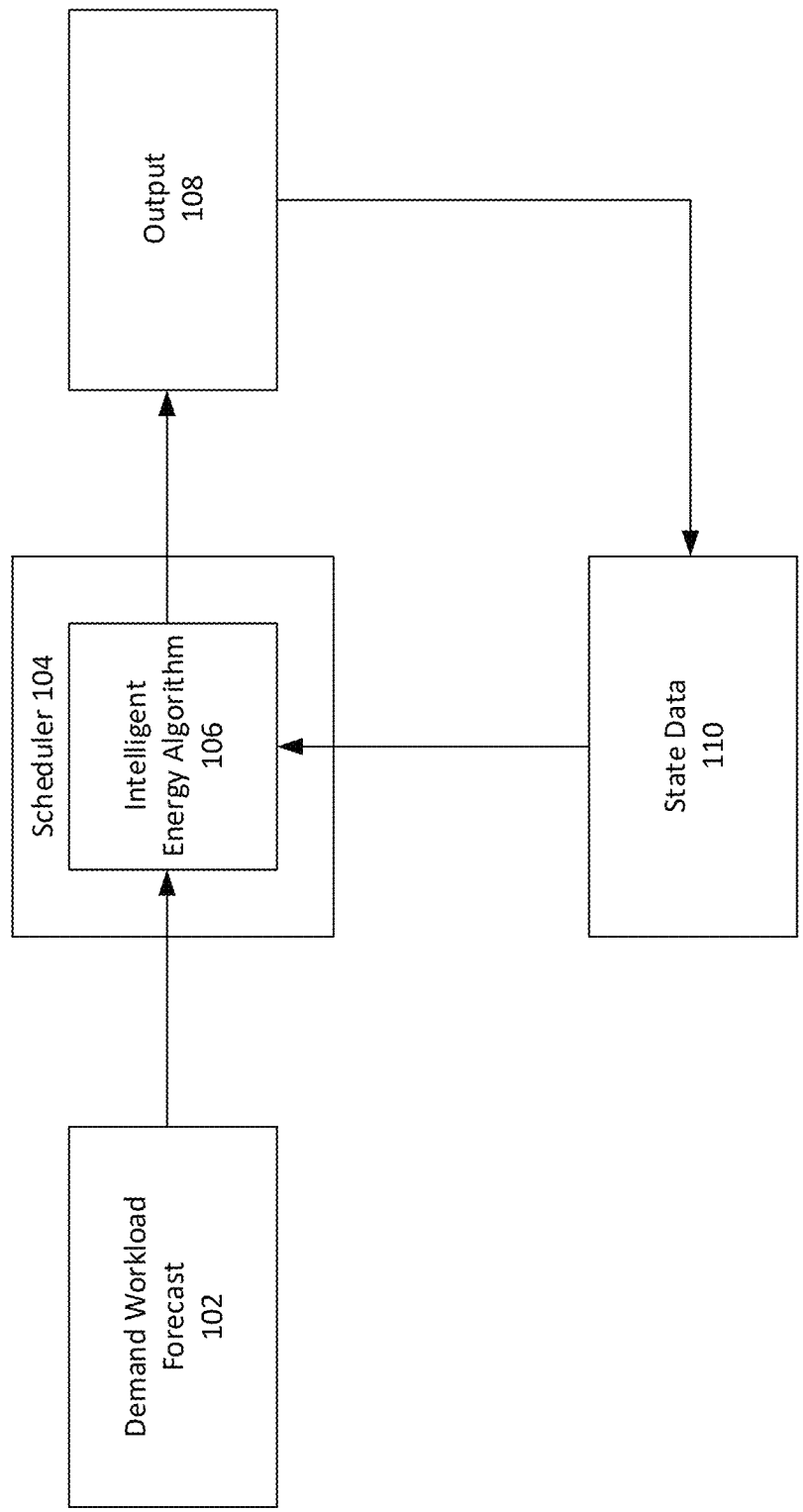
FIG. 1 is a flow diagram for an example method of executing an intelligent energy algorithm according to aspects of the disclosure.

FIG. 1 illustrates a flow diagram of the operation of a scheduler. According to some examples, the scheduler 104 is a datacenter scheduler that includes an intelligent energy algorithm 106. The scheduler 104 may schedule, and reschedule when needed, programs onto machines or servers for execution. The scheduler 104 may manage the lifecycle of the programs. The programs may be, in some examples, jobs or workloads. The programs being scheduled by the scheduler 104 may have different lengths, requirements, preferences, etc. Programs, jobs, and/or workloads may be used interchangeably throughout the disclosure and may, therefore, be referring to the same thing.

According to some examples, the jobs will typically have different priorities, latency tolerance, resource requirements, completion time, as well as other requirements. The scheduler 104 may consider criteria such as machine capacity (e.g., CPU, memory), eviction policy (e.g., evict lower priority jobs to make room for higher priority jobs), bandwidth congestion, as well as others, when assigning jobs/workloads to machines or servers. The scheduler 104 is configured via the intelligent energy algorithm 106 to adaptively create, manage and maximize a pool of idle machines in a datacenter. Idle machines may include, for example, machines that are not currently and/or actively running any jobs. According to some examples, the pool of idle machines may be put into a deep idle state, thereby increasing the energy efficiency.

A demand workload forecast 102 is determined and serves as an input to the intelligent energy algorithm 106. The demand workload forecast 102 may be associated with the datacenter, e.g., servers/machines, and the datacenter state, e.g., state data 110. The demand workload forecast 102 can include various metrics associated with the upcoming workload along with the expected time the upcoming workload will need to be completed. Examples of such metrics include the size of the workload as determined by a parameter associated with the number of data records included as part of the job or the type of workload (e.g., video compression versus responding to search queries), the breakdown of workload priorities and latency tolerance, required completion time and eviction resilience, etc. The expected time deadline for completing the workload may be reflective of the priority of a workload relative to another workload. Specifically, a workload with a higher priority may need to be completed before a workload with a lower priority. According to some examples, the demand workload forecast may include overall demand, e.g., overall datacenter-level demand, as well as job-level information. Job-level information may include, for example, priority, service level objective ("SLO") requirements, latency and eviction tolerance, size, resource requirements, completion time, etc.

The state data 110 may be, for example, the datacenter state. The state data 110 may include the current workload usage (e.g., the size of workload served so far), states of the machines or servers, power budgets, or the like. The current workload usage may provide an indication of the completion level of workloads that are already being processed by the datacenter. For example, the current workload usage may indicate the number of already assigned jobs that need to be completed or that are sitting in queue waiting to be completed. The state of the machines or servers may, for example, provide a measure of the server power utilization. The power budget may include, for example, variable cooling limits, demand response restrictions, etc. In some examples, the state of the machines may be the idle state or power mode for a given machine. For example, machines in a free pool of machines may be in an idle state while machines in a bin-packed pool of active machines may be actively serving jobs. The idle state may, in some examples, be a deep idle state. For example, the idle states of the machines may vary from a deep idle state to a less deep idle state. A deep idle state may reduce power consumption as compared to a less deep idle state. In some examples, a deep idle state may require more time to deactivate and be ready to serve jobs as compared to a less deep idle state. The bin-packed pool of machines may be, for example, a pool of machines that are fully, partially, or tightly packed. Accordingly, bin-packed, as used above and herein, may be used interchangeably with fully packed, tightly packed, or partially packed pool of active machines. According to some examples, references to a pool of active machines may refer to a bin-packed, fully packed, tightly packed, or partially packed pool of active machines.

The intelligent energy algorithm 106 may receive the demand workload forecast 102 and/or the state data 110 as input. The output 108 of the intelligent energy algorithm 106 may include an updated distribution of the jobs onto a bin-packed pool of active machines to meet the workload demand and identification of a free pool of machines that are put in idle states or reduced power modes.

According to some examples, the intelligent energy algorithm 106 may be represented by the following formula(s):

$$\min_{\alpha_i, GCU_i, RAM_i} \frac{1}{\tau} \sum_{i=1}^{n} \sum_{j=1}^{\tau} P_i(t+j)$$

In such an example, Pi(t+j) may refer to the power usage of platform i at the time t+j. According to some examples, Pi(t+j) may be determined using the following formula:

$$[\alpha_i(t+j).F_i(GCU_i(t+j), RAM_i(t+j), HW_{config-id}) +$$

$$(1 - \alpha_i(t+j)).F_{0_i}(HW_{config-id}).\beta_i(HW_{config-id}, S_{deep_i}(t+j))]$$

In some examples, Fi(.) may indicate the mapping between power usage and the input arguments, F0i(.) may correspond to the idle power of platform i. The idle power of platform i may be a function of the hardware ("HW") configuration/type. In some examples n may refer to the total number of servers in the datacenter.

According to some examples, the intelligent energy algorithm may further include determining the total GCU, the total RAM, and other requirements. For example, the intelligent energy algorithm 106 may include a determination of:

$$\sum_{i=1}^{n} GCU_i(t) = GCU_{total}(t) \text{ and}$$

$$\sum_{i=1}^{n} RAM_i(t) = RAM_{total}(t)$$

The requirements may include, for example:

$$GCU_i(t) < \min[GCU_{capacity}, (HW_{config-id}, GCU_{optimal} (HW_{config-id}, \text{memory bandwidth, performance})]$$

According to some examples, $\alpha_i$ may equal {0,1} with 0 and 1 indicating the machine to be serving and idling, respectively. In some examples, $\beta_i(t)$: [0,1] may indicate the level of idle power reduction in the pool of the idle subset as a function of the platform type and Sdeepi(t). Sdeepi(t) may correspond to the deep idle state for platform i at time t. Sdeepi(t) may be a function of the deep idle actuation mechanisms available for the given platform type, recovery time, latency tolerance, and SLO of the upcoming, or forecasted, workload over the next $\gamma$ samples, e.g., GCUtotal (t, t+$\gamma$) to be scheduled on platform i, and other requirements.

According to some examples, the intelligent energy algorithm 106 may consider platform preference for satisfying picky jobs. The GCU_{total}(t) may be determined based on workload SLOs, latency tolerance, eviction resilience, or the like. Other considerations of the intelligent energy algorithm 106 may include, for example, network congestions. Optimization of the intelligent energy algorithm 106 may be performed using a reinforcement learning agent, model predictive control, or other algorithms.

While the formulas provided above are generally for computer servers, substantially formulas and frameworks may be applied to other processing elements, such as accelerators. Further, the above formulas serve as just one example, as there may be other forms of writing the optimization objective and constraints, e.g., deterministic versus stochastic, etc. Accordingly, the above formulas are not intended to be limiting.

According to some examples, the output 108, or redistribution, may take the form of a workload profile that identifies active servers/machines and usage levels, along with a free pool of servers/machines. The size of the free pool of machines is then adaptively adjusted based on the workload demand forecast as new workloads are processed. In some examples, the adaptive adjustment occurs in real-time. The scheduler 104 may then use the updated distribution to control the operation of the datacenter by redistributing workloads onto the bin-packed machines and placing the free pool of machines into idle states or reduced power mode. In some examples, by redistributing the workloads onto the bin-packed machines and placing the free pool of machines into idle states or reduced power mode, the state data 110 may be updated.

According to some examples, when generating the new workload profile, the scheduler 104 considers one or more factors. The factors may include, for example, workload priority, SLOs, and/or expected completion time. SLOs may include, for example, latency tolerance, reliability, eviction resilience, or the like. In some examples, the factors may include workload pickiness level. The workload pickiness level may be based on the resource requirements and/or platform preference of a given job. According to some examples, the factors may include platform types and resources, such as memory 304, CPU/GPU, etc. The factors may, additionally or alternatively, include hardware mix in a cell, hardware mix compute/watt profile, available states of reduced power or available idle states, the extent of power reduction in each idle state, the recovery time from each of the available reduced idle power states. Hardware mix in a cell may include, for example, the machines and jobs placed on those machines. The factors may include trade-offs between energy savings and potential performance impact based on bin picking.

According to some examples, the intelligent energy algorithm 106 may utilize the demand workload forecast 102, amongst other factors, when determining the size of the free pool of machines in the idle state and/or reduced power mode. The size of the free pool of machines may be, for example, the number of machines within the free pool of machines. In some examples, there may be one or more free pools of machines with each free pool of machines having at least one machine. If the size and/or number of free pool of machines is too large, or if an incoming work-load is unaccounted for, this may result in an unacceptable and/or unwanted impact on and delay to high priority jobs, or capacity stock-out. Alternatively, if the free pool of machines is too small, the energy savings will be less than what the system is capable of. Accordingly, the scheduler 104, utilizing the intelligent energy algorithm 106, takes into account such factors when determining the workload profile to increase the energy efficiency of the system while also serving jobs in the expected time and manner.

According to some examples, the updated distribution of jobs onto the pool of active machines and identification of the free pool of machines that are in an idle or reduced power state may allow the active machines to run at a higher compute utilization such that energy efficiency of the server is increased, e.g., higher compute per Watt ratio. The intelligent energy algorithm 106 allows for substantially real-time optimization of energy efficiency, by adjusting the size of the free pool of machines.

Figure 2:
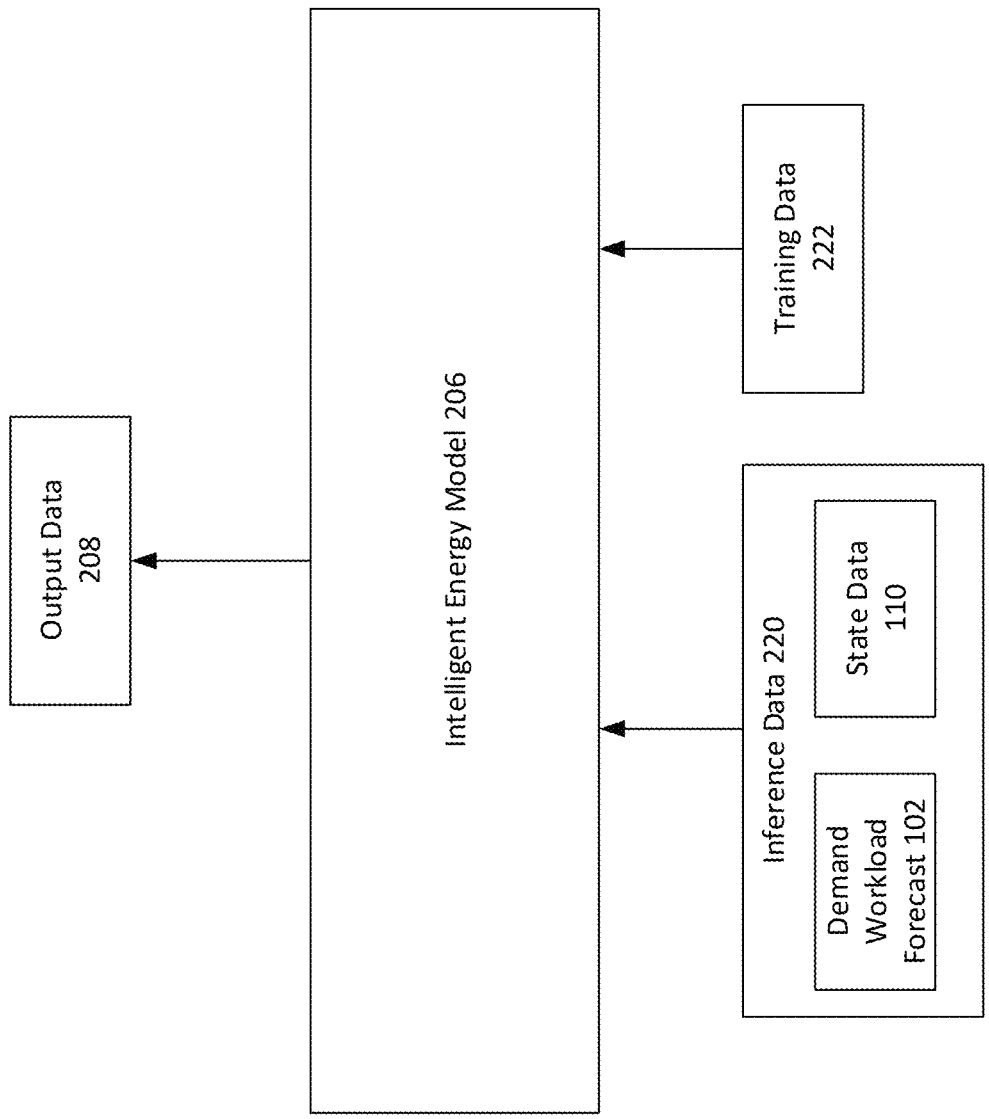
FIG. 2 is a block diagram of an example intelligent energy model according to aspects of the disclosure.

In some examples, the updated distribution of jobs will typically respect the workload SLOs and/or performance requirements of the machines, jobs, or the like. For instance, packing the pool of active machines too tightly, e.g., bin-packing beyond a certain point, can have a detrimental effect on performance and the performance impact tolerance may vary between the jobs depending on their priority level. An example of such a performance metric is Million Instructions per Seconds (MIPS), but other variations could be also used. FIG. 2 depicts a block diagram of an example intelligent energy model 206, which can be implemented on one or more computing devices. The intelligent energy model 206 can be configured to receive inference data 220 and/or training data 222 for use in updating the distribution of jobs in a system onto a bin-packed pool of active machines and identifying a free pool of machines to be put in an idle state or reduced power mode to increase the power efficiency of the system. For example, by redistributing jobs onto the bin-packed pool of active machines while having the machines in the free pool of machines be put into an idle state, the energy efficiency of the system is increased as one set of machines, e.g., the bin-packed pool of machines, is actively serving jobs while another set, e.g., the free pool of machines, is in an idle state conserving energy. In comparison, without the redistribution of jobs to the bin-packed pool of machines, all machines may be actively serving jobs and, therefore, require an increased energy use as compared to only some of the machines, e.g., the bin-packed pool of machines, serving jobs.

The intelligent energy model 206 may receive the inference data 220 and/or training data 222 as part of a call to an application programming interface (API) exposing the intelligent energy model 206 to one or more computing devices. Inference data 220 and/or training data 222 can also be provided to the intelligent energy model 206 through a storage medium, such as remote storage connected to the one or more computing devices over a network. Inference data 220 and/or training data 222 can further be provided as input through a user interface on a client computing device coupled to the intelligent energy model 206.

The inference data 220 can include data associated with determining the redistribution of jobs amongst machines within a system onto the bin-packed pool of active machines such that a free pool of machines may be identified. The machines in the free pool of machines may be put into an idle state or reduced power mode. The inference data 220 may include, for example, the demand workload forecast 102 and/or the state data 110. According to some examples, the inference data 220 may include, but is not limited to, historical workload trends in various datacenter locations along with their priorities, resource and other requirements, job-level mapping between power usage and CPU, GPU and accelerator usage, memory, duty cycle, completion time, and other relevant features on various server/platform types/configurations, whether or not an incoming workload can safely fit on the currently active pool of machines, or the like.

The training data 222 can correspond to an artificial intelligence (AI) task, such as a machine learning (ML) task, for predicting an updated workload profile, such as a task performed by a neural network. The updated workload profile may be, for example, an updated distribution of the jobs onto a bin-packed pool of active machines to meet the workload demand and identification of a free pool of machines that are put in idle states or reduced power modes. The training data 222 can be split into a training set, a validation set, and/or a testing set. An example training/validation/testing split can be an 80/10/10 split, although any other split may be possible. The training data 222 can include examples for determining an updated distribution of the jobs onto a pool of active machines to meet the workload demand and identification of a free pool of machines that are put in idle states or reduced power modes. The training data 222 may, in some examples, be similar to the inference data 220. For example, the training data 222 may include the demand workload forecast 102, the state data 110, historical workload trends in various datacenter locations along with their priorities, resource and other requirements, job-level mapping between power usage and CPU, GPU and accelerator usage, memory, duty cycle, completion time, and other relevant features on various server/platform types/configurations, whether or not an incoming workload can safely fit on the currently active pool of machines, or the like. According to some examples, the training data 222 may include samples of the datacenter load and power efficiency (e.g., MIPS/W) under different configurations.

The training data 222 can be in any form suitable for training a model, according to one of a variety of different learning techniques. Learning techniques for training a model can include supervised learning, unsupervised learning, and semi-supervised learning techniques. For example, the training data 222 can include multiple training examples that can be received as input by a model. The training examples can be labeled with a desired output for the model when processing the labeled training examples. The label and the model output can be evaluated through a loss function to determine an error, which can be backpropagated through the model to update weights for the model. For example, if the machine learning task is a classification task, the training examples can be images labeled with one or more classes categorizing subjects depicted in the images. As another example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

From the inference data 220 and/or training data 222, the intelligent energy model 206 can be configured to output one or more results related to an updated workload generated as output data 208. As examples, the output data 208 can be any kind of score, classification, or regression output based on the input data. Correspondingly, the AI or machine learning task can be a scoring, classification, and/or regression task for predicting some output given some input. These AI or machine learning tasks can correspond to a variety of different applications in processing images, video, text, speech, or other types of data to update the distribution of jobs amongst the machines to increase the energy efficiency of the system. The output data 208 can include instructions 305 associated with an updated workload profile that redistributes jobs to a bin-packed pool of active machines and identifies machines to be in a free pool of machines that are placed in an idle state and/or reduced power mode.

As an example, the intelligent energy model 206 can be configured to send the output data 208 for display on a client or user display. As another example, the intelligent energy model 206 can be configured to provide the output data 208 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. The intelligent energy model 206 can further be configured to forward the output data 208 to one or more other devices configured for translating the output data 208 into an executable program written in a computer programming language. The intelligent energy model 206 can also be configured to send the output data 208 to a storage device for storage and later retrieval.

Figure 3A:
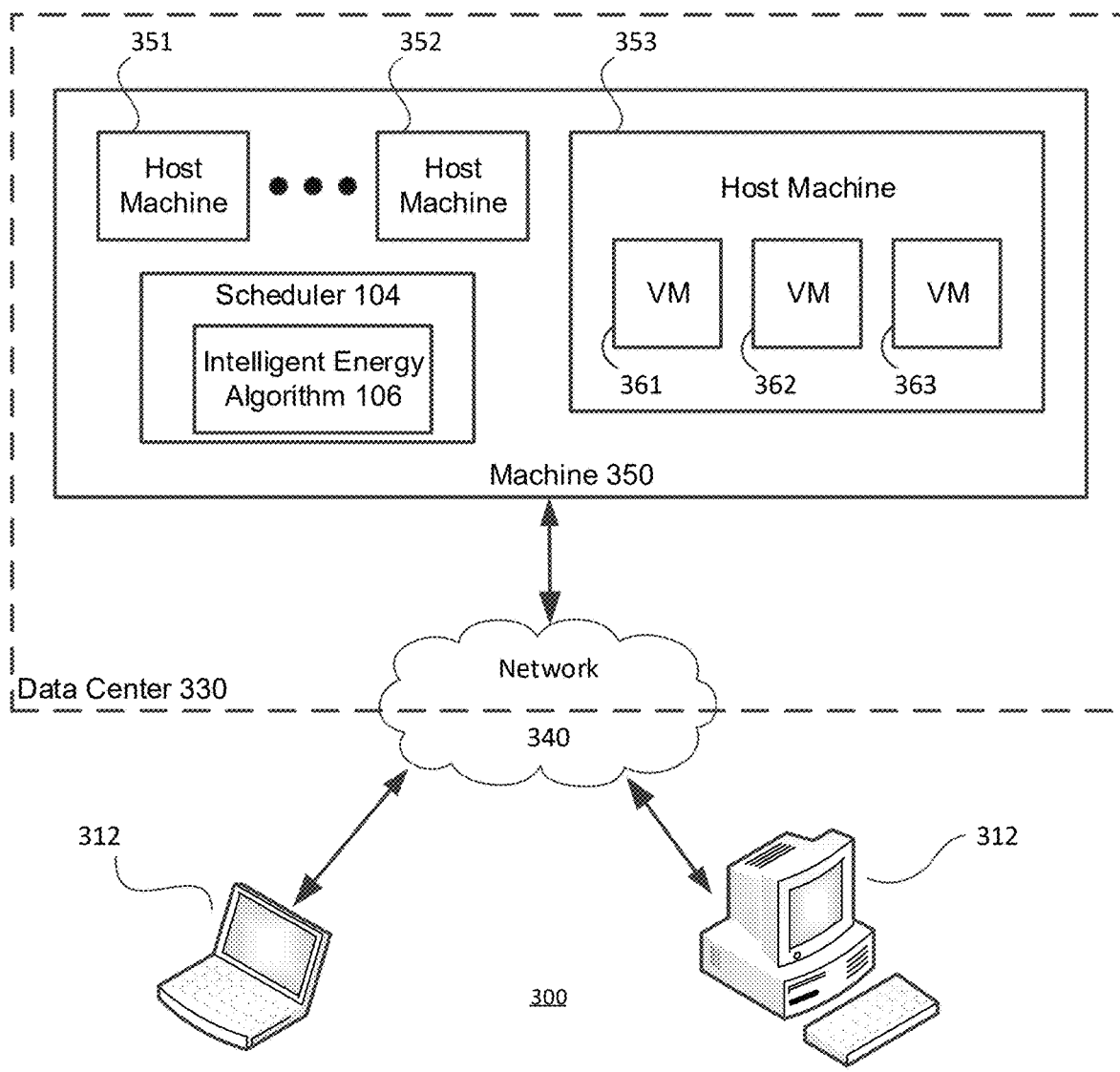
FIG. 3A is a block diagram of an example system according to aspects of the disclosure.

FIG. 3A is a block diagram of an example system 300 for processing workloads. The system 300 includes a datacenter 330 of machines connected to one or more client devices 312 via network 340.

The datacenter 330 may be divided into a plurality of separate machines 350, such as servers, hardware accelerators, or the like. In the example of FIG. 3A, machine 350 may include its own computing devices that may act as host machines 351, 352, 353, such as one or more computers or servers for hosting one or more virtual machines (VMs) 361, 362, 363 within the machine. Data and instructions provided to the network 340 may be directed to a particular machine 350 for processing and storage at the processing resources such as processors, and the storage resources such as memory, of the machine 350. The various resources may be designated to VMs 361, 362, 363 at a corresponding host machine 353 of the machine 350 as the VMs are created to handle the various instructions and data that are received from the client devices 312 or the other machines 350. Instructions and data may include data sets, workloads or jobs to be executed on the data sets, or a combination thereof.

Each client device 312 may be, for example, a computer. The client device 312 may have all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor, speakers, a modem and/or network interface device, user input, such as a mouse, keyboard, touch screen or microphone, and all of the components used for connecting these elements to one another. Moreover, computers, as used herein, may include any devices capable of processing instructions and transmitting data to and from humans and other computers, including, by way of example and without limitation, general purpose computers, PDAs, tablets, mobile phones, smartwatches, network computers lacking local storage capability, set top boxes for televisions, other networked devices, etc.

Each machine 350 may further include a respective scheduler 104 for handling the received workloads. Handling workloads may involve choosing a particular type of VM best suited for executing the workload, choosing a particular host machine best suited for hosting the VM, as well as instantiating and binding a VM of the chosen VM type to the chosen host machine. VM types may vary depending on resources committed to the VM, whereby each VM type may be considered to have a different "shape," referring to the respective amounts of different types of resources committed to the VM. Resource types may include, but are not limited to, a number of central processing units (CPUs), an amount of available random-access memory, an amount of solid-state drive memory, and so on.

The scheduler 104 can handle a stream of workloads received at the machine 350. For instance, the machine may include a workload queue, and the scheduler 104 may choose VM types and host machines for each of the received workloads according to an order specified by the workload queue. According to some examples, the scheduler 104 may choose a server for each of the received workloads. The scheduler 104 may choose the server for the workloads based on the intelligent energy algorithm 106. For example, based on the demand workload forecast and the state data associated with each host machine, VM, or the like, the intelligent energy algorithm 106 may determine an updated workload profile for redistributing the workload to the host machines 141-143, VMs 151-153, or the like. In some examples, the intelligent energy algorithm 106 may identify one or more host machines and/or VMs to include in the free pool of machines that are in idle states and/or reduced power modes.

Figure 3B:
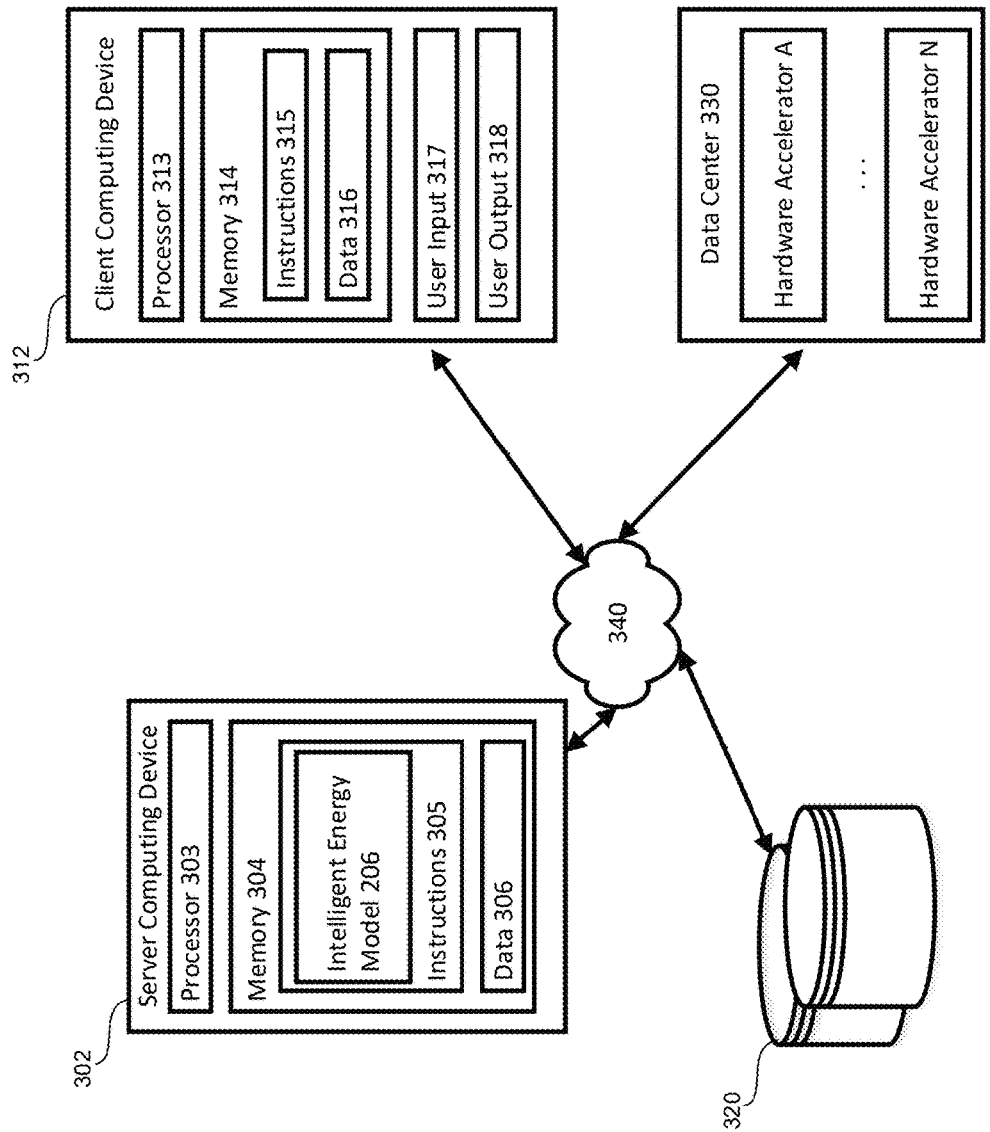
FIG. 3B is a block diagram of an example system according to aspects of the disclosure.

FIG. 3B depicts a block diagram of an example environment for implementing an intelligent energy model 206. The intelligent energy model 206 can be implemented on one or more devices having one or more processors 303 in one or more locations, such as in server computing device 302. Client computing device and the server computing device 302 can be communicatively coupled to one or more storage devices 320 over a network 340.

The network 340 and intervening nodes described herein can be interconnected using various protocols and systems, such that the network can be part of the Internet, World Wide Web, specific intranets, wide area networks, or local networks. The network can utilize standard communications protocols, such as WiFi, Bluetooth, 4G, 5G, etc., that are proprietary to one or more companies. Although certain advantages are obtained when information is transmitted or received as noted above, other aspects of the subject matter described herein are not limited to any particular manner of transmission.

The storage devices 320 can be a combination of volatile and non-volatile memory 304 and can be at the same or different physical locations than the computing devices. For example, the storage devices 320 can include any type of non-transitory computer readable medium capable of storing information, such as a hard-drive, solid state drive, tape drive, optical storage, memory 304 card, ROM, RAM, DVD, CD-ROM, write-capable, and read-only memories.

The server computing device 302 can include one or more processors 303 and memory 304. The memory 304 can store information accessible by the processors, including instructions 305 that can be executed by the processors. The memory 304 can also include data that can be retrieved, manipulated, or stored by the processors. The memory 304 can be a type of non-transitory computer readable medium capable of storing information accessible by the processors, such as volatile and non-volatile memory 304. The processors 303 can include one or more central processing units (CPUs), graphic processing units (GPUs), field-programmable gate arrays (FPGAs), and/or application-specific integrated circuits (ASICs), such as tensor processing units (TPUs).

The instructions 305 can include one or more instructions 305 that, when executed by the processors 303, cause the one or more processors 303 to perform actions defined by the instructions 305. The instructions 305 can be stored in object code format for direct processing by the processors 303, or in other formats including interpretable scripts or collections of independent source code modules that are interpreted on demand or compiled in advance. The instructions 305 can include instructions 305 for implementing the intelligent energy model 206, which can correspond to the intelligent energy model 206 of FIG. 2. The intelligent energy model 206 can be executed using the processors, and/or using other processors 303 remotely located from the server computing device 302.

The data 306 can be retrieved, stored, or modified by the processors 303 in accordance with the instructions 305. The data 306 can be stored in computer registers, in a relational or non-relational database as a table having a plurality of different fields and records, or as JSON, YAML, proto, or XML documents. The data 306 can also be formatted in a computer-readable format such as, but not limited to, binary values, ASCII, or Unicode. Moreover, the data 306 can include information sufficient to identify relevant information, such as numbers, descriptive text, proprietary codes, pointers, references to data stored in other memories, including other network 340 locations, or information that is used by a function to calculate relevant data.

The client computing device 312 can also be configured similarly to the server computing device 302, with one or more processors 313, memory 314, instructions 315, and data 316. The client computing device 312 can also include user input(s) 317 and user output(s) 318. The user input 317 can include any appropriate mechanism or technique for receiving input from a user, such as keyboard, mouse, mechanical actuators, soft actuators, touchscreens, microphones, and sensors.

The server computing device 302 can be configured to transmit data to the client computing device 312, and the client computing device 312 can be configured to display at least a portion of the received data on a display implemented as part of the user output 318. The user output can also be used for displaying an interface between the client computing device and the server computing device 302. The user output can alternatively or additionally include one or more speakers, transducers or other audio outputs, a haptic interface or other tactile feedback that provides non-visual and non-audible information to the platform user of the client computing device.

Although FIG. 3B illustrates the processors and the memories as being within the computing devices, components described herein can include multiple processors and memories that can operate in different physical locations and not within the same computing device. For example, some of the instructions and the data can be stored on a removable SD card and others within a read-only computer chip. Some or all of the instructions and data can be stored in a location physically remote from, yet still accessible by, the processors. Similarly, the processors can include a collection of processors that can perform concurrent and/or sequential operation. The computing devices can each include one or more internal clocks providing timing information, which can be used for time measurement for operations and programs run by the computing devices.

The server computing device 302 can be connected over the network 340 to a datacenter 330 housing any number of servers, machines, hardware accelerators, or the like. The datacenter 330 can be one of multiple datacenters or other facilities in which various types of computing devices, such as services, machines, hardware accelerators, etc. are located. According to some examples, the datacenter 330 may include one or more processors, memory, storage, or the like. For example, while the datacenter 330 is illustrated as including hardware accelerators, the datacenter 330 may include other types of processors in addition to or as an alternative of the hardware accelerators. The 330 datacenter may also refer to a collection of multiple datacenters at different geographic locations managed through a centralized workload scheduler or controller.

The server computing device 302 can be configured to receive requests to process data from the client computing device 312 on computing resources in the datacenter 330. For example, the environment can be part of a computing platform configured to provide a variety of services to users, through various user interfaces and/or application programming interfaces (APIs) exposing the platform services. The client computing device can transmit input data associated with Updating the workload profile of the datacenter 330. The intelligent energy model 206 can receive the input data, and in response, generate output data 208 including an updated workload profile.

As other examples of potential services provided by a platform implementing the environment, the server computing device 302 can maintain a variety of models in accordance with different constraints available at the datacenter. For example, the server computing device 302 can maintain different families for deploying models on various types of TPUs and/or GPUs housed in the datacenter or otherwise available for processing.

Figure 4:
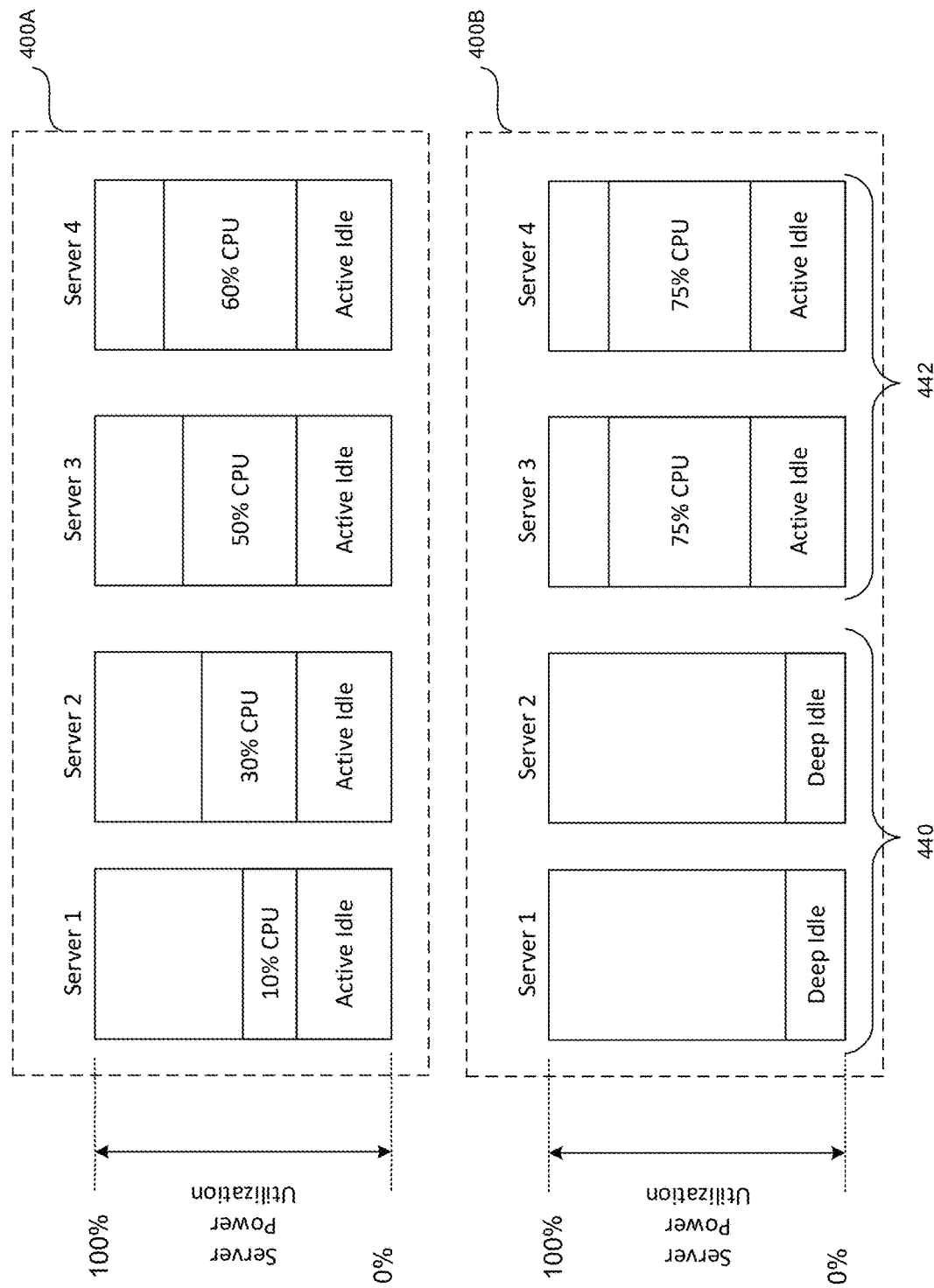
FIG. 4 is a representation of a datacenter implementing an updated workload profile according to aspects of the disclosure.

FIG. 4 illustrates an example of updating the distribution of jobs within a datacenter based on the output of the intelligent energy algorithm. As illustrated in FIG. 4, a representation 400A of the datacenter is shown as having four machines or servers, e.g., Servers 1, 2, 3, 4. The four machines are operating at different power usage capacities. For example, Server 1 is operating at 10% CPU usage, Server 2 is operating at 30% CPU usage, Server 3 is operating at 50% CPU usage, and Server 4 is operating at 60% CPU usage. The total CPU usage across all four machines is 150%. The scheduler 104 may utilize the intelligent energy algorithm 106 to redistribute the workload profile, e.g., the 150% CPU usage, amongst the Servers 1-4 to increase the energy efficiency of the server while fulfilling the requirements and/or preferences of the current jobs and considering the demand workload forecast, requirements, and/or preferences of upcoming jobs. According to some examples, by redistributing the workload profile, one or more servers may be able to enter an idle state such that there is an increase in power reduction. Increasing the power reduction may increase the energy efficiency of the servers.

The demand workload forecast for the datacenter, shown in representation 400A, may be determined and used, in conjunction with the current usage profile, as input into the intelligent energy algorithm 106. The intelligent energy algorithm 106 may determine an updated workload profile, such as an updated distribution of the jobs currently being served by the machines within datacenter 400A. For example, the intelligent energy algorithm 106 may determine that the current workload profile, e.g., the 150% CPU usage, can be redistributed to Servers 3 and 4, while Servers 1 and 2 can be pushed into idle states. The idle states may include any type of idle state from a less deep idle state to a deeper idle state. A less deep idle state may be, for example, an active idle state. Redistributing the workload to Server 3 and 4 and pushing Servers 1 and 2 into an idle state results in a more efficient use of energy in the datacenter as compared to having the workload spread across Servers 1, 2, 3, and 4. The CPU usage of Servers 1 and 2 would, in the updated workload profile, be allocated to the other servers, e.g., Servers 3 and 4.

Representation 400B of the datacenter illustrates the redistribution of the workload. The redistribution of the workload may be based on an updated workload profile. The updated workload profile may cause one or more of the servers to enter into an idle state while the workload is redistributed to other servers. For example, as shown in representation 400B, the workload of Servers 1 and 2 is redistributed to Servers 3 and 4 such that Servers 1 and 2 can enter into an idle state. In this example, servers 1 and 2 are part of the free pool of machines 440 that are in an idle state and/or reduced power mode while Servers 3 and 4 are part of the bin-packed pool of active machines 442. Servers 1 and 2 may be part of the free pool of machines 440 as the workload that Servers 1 and 2 were previously serving, shown in representation 400A, has since been reallocated to the bin packed pool of active machines 442, e.g., Servers 3 and 4, based on the updated workload profile.

According to some examples, jobs that were previously being served by Servers 1 and 2 may include specific preferences to execute the jobs. The preferences may be, for example, due to pickiness with respect to the resource requirements and/or platform preferences. The resource requirements can include any one or more of the amount of memory, CPU/GPU utilization, or the like. Jobs with specific preferences may be reallocated to another specific machine that meets the preferences of the job. The intelligent energy algorithm may, in some examples, receive the job preferences as input when determining the updated workload profile.

The machines within the free pool of machines 440 that are in idle states and/or reduced power modes may have varying recovery time when deactivating an idle state. The idle state may enable an increase in power reduction and, therefore, more energy efficiency. Different idle states may require more time than others for recovery before the machine is ready to serve a job. Therefore, identifying which machines and how many machines should be within the free pool of machines requires an understanding of the demand workload forecast 102, the state data 110 of the machines, or the like. As such, the size of the idling machines within the free pool of machines 440, the selected deep idle state, and the duration in the given idle state may be adjusted based on the workload demand forecast 102.

A deeper idle state allows for a greater reduction in power but may result in requiring more time for the machine to recover and be ready for serving a job. In some examples, a deep idle state may take up to several minutes before the machines are ready to serve a job. A less deep idle state may still provide for a reduction in power but the reduction in power may be less than a deeper idle state. In some examples, a less deep idle state can take in the order of milli-seconds or less to be ready to serve a job.

The intelligent energy algorithm may utilize the demand workload forecast 102, state data 110, amongst other factors, to determine how many machines should be allocated to the free pool of machines 440 and/or an idle power state for a given set of machines in the free pool of machines 440. The other factors may include, for example, the priority of the jobs, SLOs, expected completion times, latency tolerance, etc. As an example, if the demand workload forecast 102 indicates that there is going to be an increase in jobs, the intelligent energy algorithm 106 may provide a workload and server profile in which some of the machines in the free pool of machines are in a less deep idle state, e.g., an idle state that can be ready to serve a job within milli-seconds, or sub-milliseconds, as compared to having the machines in a deeper idle state, e.g., an idle state that can be ready to serve a job within several minutes. In some examples, if the demand workload forecast 102 indicates that there is going to be a decrease in jobs, the intelligent energy algorithm 106 may redistribute the current jobs to fewer machines such that more machines may be allocated to the free pool of machines 440, thereby increasing the energy efficiency of the datacenter.

The selection of machines placed into idle states, e.g., Servers 1 and 2, within the free pool of machines 440, may be made in a platform aware manner (e.g., the type of HW, manufacturer, OS, size of memory, CPU versus GPU versus TPU, etc.). In some examples, the selection of machines placed into idle states may be made based on the computer/watt profile of the platform to further improve energy efficiency of the datacenter. The selection of the idle state will typically be impacted by the demand forecast. For instance, if the demand forecast indicates that upcoming jobs require TPU level processing power, then the intelligent energy algorithm can determine that it needs to keep a certain amount of TPU processing power in a less deep idle state. As another example, if the demand forecast indicates that the upcoming jobs are not time sensitive, then the intelligent energy algorithm can put the more energy hungry but faster processors (e.g., TPU) into a deep idle state and use more energy efficient but slower processors (e.g., CPUs) in an idle state where they can be restored to full processing capacity in a relatively short time period, e.g., on the order of milliseconds or less, to process those time sensitive jobs in queue.

According to some examples, the updated workload profile and redistribution of workload across the machines is executed at the control level of the system, rather than the CPU level. For example, if the updated workload profile was executed at the CPU level, the current workload that is being served by a plurality of machines would all be redistributed to a single machine. However, by updating the workload profile and applying the changes at the control level of the system, the current workload can be redistributed to machines in the bin-packed pool of machines while some machines are allocated to the free pool of machines. This allows for improved performance in the latency that impacts that would be experienced were the current workload redistributed to a single CPU. In some examples, by applying the updated workload profile at the control level, rather than the CPU level, machines allocated to the free pool of machines may be kept empty, e.g., free of actively serving jobs, and/or in idle state, such as a deep idle state, as long as possible.

Figure 5:
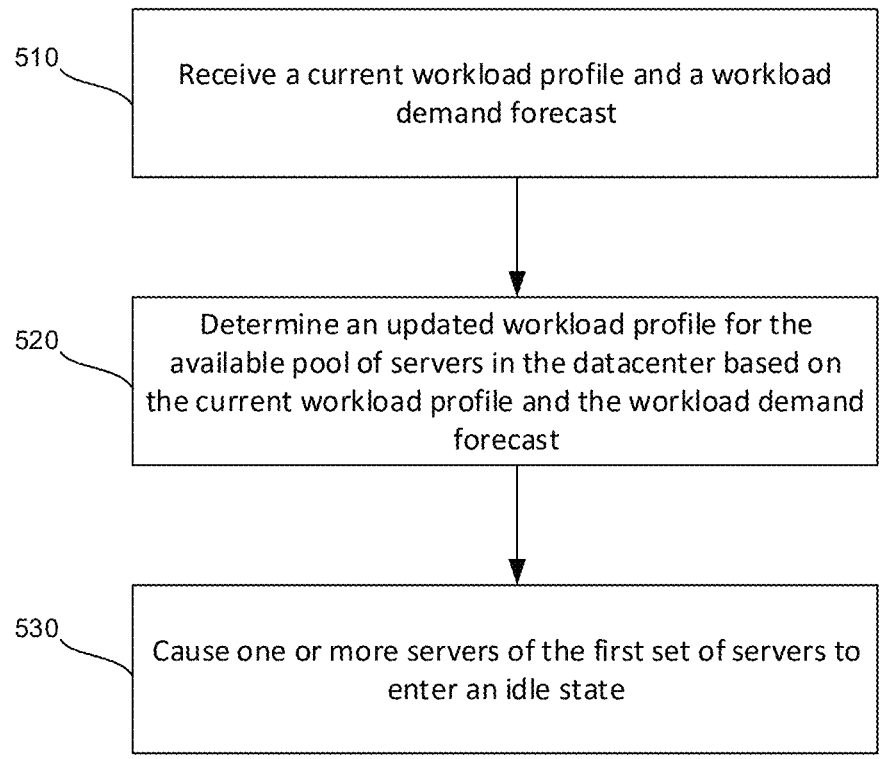
FIG. 5 is a flow diagram for an example method of updating a workload profile according to aspects of the disclosure.

FIG. 5 illustrates an example method for redistributing workloads to increase the energy efficiency of the system. The following operations do not have to be performed in the precise order described below. Rather, various operations can be handled in a different order or simultaneously, and operations may be added or omitted.

In block 510, a current workload profile and a workload demand forecast is received. The current workload profile and workload demand forecast may be received by a processing element. The processing element may be, for example, a scheduler, such as a datacenter scheduler. The current workload profile may include a power usage profile for a first set of servers from an available pool of servers in the datacenter that are executing one or more current workloads associated with the current workload profile.

In block 520, an updated workload profile for the available pool of servers in the datacenter may be determined based on the current workload profile and the workload demand forecast. The current workload profile may include current workloads or jobs of nonuniform sizes. The updated workload profile includes a redistribution of the workload profile onto a second set of servers of the available pool of servers. The second set of servers may include the same, less, or more servers than the first set of servers depending on the nature of the workload, and its performance and resource requirements. In some examples, when determining the updated workload profile, the upcoming workloads of non-uniform sizes and the current workloads of non-uniform sizes may be bin-packed onto the second set of servers.

According to some examples, the workload demand forecast includes information identifying upcoming workloads or jobs to be processed by the available pool of servers. In some examples, workloads or jobs may be delayed dependent on the SLO and latency sensitivity or resilience. In some examples, the workload demand forecast may include information indicating workload priority, system level objectives ("SLOs"), expected completion time, eviction tolerance/resilience, and/or latency tolerance associated with the upcoming workloads or jobs. The workload demand forecast may include upcoming workloads, or jobs, of non-uniform sizes.

The redistribution of the workload profile onto the second set of servers may comprise allocating an aggregate usage level associated with the first set of servers to the second set of servers. The usage level may be, in some examples, a CPU or GPU usage level. In some examples, the usage level may be a workload or job usage level. For example, referring to FIG. 4, the aggregate CPU usage level associated with Servers 1 and 2, e.g., 40%, may be allocated to Servers 3 and 4. In some examples, the aggregate unit of workload, e.g., CPU, GCU, or TPU, usage level associated with the second set of servers may be redistributed such that each server has substantially the same or different amount of workload usage. Continuing with the example in FIG. 4, the total CPU usage level was 150%. The CPU usage level was redistributed between Servers 3 and 4, such that Servers 3 and 4 each have a CPU usage level of 75%.

In block 530, one or more servers of the first set of servers may enter an idle state, such as a deep idle state, based on the updated workload profile. According to some examples, an amount of the first set of servers to enter an idle state may be adjusted based on a change in the workload demand forecast. In some examples, an idle state of at least one server of the first set of servers may be adjusted based on a change in the workload demand forecast. Adjusting the idle state may include adjusting the idle state to a deep idle state or a less deep idle state. For example, a deep idle state may be an idle state that enables more idle power reduction and may take longer to deactivate as compared to a less deep idle state.

According to some examples, when one or more of the servers of the first set of servers enters the idle state, the number of servers in the first set of servers may be dynamically adjusted to accommodate the fluctuation in workload over time. For example, by having one or more of the servers of the first set of servers enter the idle state, the number of servers in the first set of servers may increase and the number of servers in the second set of servers may decrease. The number of servers in the first set of servers and the second set of servers may continue to be dynamically adjusted by the intelligent energy algorithm to accommodate the fluctuation in workload over time.

According to some examples, the intelligent energy algorithm may allow for heterogeneous free pools and the ability to manage power efficiency-per workload and HW differences. For example, there may be various platform types with various power usage curves. The mix of HW and platforms to choose for the idle versus active pool may impact the level of power usage and/or saving. The intelligent energy algorithm may consider the platform mix and heterogeneity when determining what machines should be included in the pool of active machines versus the pool of free or idle machines.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions 305 that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks, such as a TensorFlow framework, a Microsoft Cognitive Toolkit framework, an Apache Singa framework, or an Apache MXNet framework, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a stand alone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components, or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purposes logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method for managing energy usage in a datacenter, comprising:
   receiving, at a processing element, a current workload profile and a workload demand forecast, the current workload profile including a power usage profile for a first set of servers from an available pool of servers in the datacenter that are executing one or more current workloads associated with the current workload profile, wherein a type of servers in the first set of servers is dynamically adjusted based on power usage curves;
   determining, by the processing element, an updated workload profile for the available pool of servers in the datacenter based on the current workload profile and the workload demand forecast, the determined updated workload profile including a redistribution of the current workload profile onto a second set of servers of the available pool of servers; and
   causing one or more servers of the first set of servers to enter an idle state.

2. The method of claim 1, wherein the workload demand forecast includes information identifying upcoming workloads or jobs to be processed by the available pool of servers.

3. The method of claim 2, wherein the workload demand forecast includes at least one of information indicating workload priority, system level objectives ("SLOs"), expected completion time, eviction tolerance, platform preference, hardware preference, resource requirements, or latency tolerance associated with the upcoming workloads or jobs.

4. The method of claim 1, wherein the redistribution of the current workload profile onto the second set of servers comprises allocating an aggregate usage level associated with the first set of servers to the second set of servers.

5. The method of claim 1, further comprising adjusting an amount of the first set of servers to enter the idle state based on a change in the workload demand forecast and the current workload being served.

6. The method of claim 1, wherein the workload demand forecast includes upcoming workloads or jobs of non-uniform sizes.

7. The method of claim 6, wherein the current workload profile includes current workloads or jobs of non-uniform sizes.

8. The method of claim 7, wherein when determining the updated workload profile the method further comprises bin-packing the upcoming workloads of non-uniform sizes and the current workloads of non-uniform sizes onto the second set of servers.

9. The method claim 1, wherein the processing element comprises a datacenter scheduler.

10. The method of claim 1, further comprising adjusting the idle state of at least one server of the first set of servers based on a change in workload usage and the workload demand forecast.

11. The method of claim 10, wherein adjusting the idle state comprising adjusting the idle state to a deep idle state or a less deep idle state.

12. A system, comprising:
one or more processors, the one or more processors configured to:
receive a current workload profile and a workload demand forecast, the current workload profile including a power usage profile for a first set of servers from an available pool of servers in a datacenter that are executing one or more current workloads associated with the current workload profile, wherein a type of servers in the first set of servers is dynamically adjusted based on power usage curves;
determine an updated workload profile for the available pool of servers in the datacenter based on the current workload profile and the workload demand forecast, the determined updated workload profile including a redistribution of the current workload profile onto a second set of servers of the available pool of servers; and
cause one or more servers of the first set of servers to enter an idle state.

13. The system of claim 12, wherein the workload demand forecast includes information identifying upcoming workloads or jobs to be processed by the available pool of servers.

14. The system of claim 13, wherein the workload demand forecast includes at least one of information indicating workload priority, system level objectives ("SLOs"), expected completion time, resource requirements, hardware preference, platform requirements, eviction tolerance, or latency tolerance associated with the upcoming workloads or jobs.

15. The system of claim 12, wherein the redistribution of the current workload profile onto the second set of servers comprises allocating an aggregate usage level associated with the first set of servers to the second set of servers.

16. The system of claim 12, wherein the one or more processors are further configured to adjust an amount of the first set of servers to enter the idle state based on a change in the workload demand forecast.

17. The system of claim 12, wherein the workload demand forecast includes upcoming workloads or jobs of non-uniform sizes.

18. The system of claim 17, wherein the current workload profile includes current workloads or jobs of non-uniform sizes.

19. The system of claim 18, wherein when determining the updated workload profile the one or more processors are further configured to bin-pack the upcoming workloads of non-uniform sizes and the current workloads of non-uniform sizes onto the second set of servers.

20. One or more non-transitory computer-readable medium storing instructions, which when executed by one or more processors, cause the one or more processors to:
receive a current workload profile and a workload demand forecast, the current workload profile including a power usage profile for a first set of servers from an available pool of servers in a datacenter that are executing one or more current workloads associated with the current workload profile, wherein a type of servers in the first set of servers is dynamically adjusted based on power usage curves;
determine an updated workload profile for the available pool of servers in the datacenter based on the current workload profile and the workload demand forecast, the determined updated workload profile including a redistribution of the current workload profile onto a second set of servers of the available pool of servers; and
cause one or more servers of the first set of servers to enter an idle state.

* * * * *